United States Patent
Uchida (10) Patent No.: US 8,990,348 B2
(45) Date of Patent: Mar. 24, 2015

(54) INFORMATION PROCESSING SYSTEM, SERVER DEVICE, INFORMATION DEVICE FOR PERSONAL USE, AND ACCESS MANAGEMENT METHOD

(75) Inventor: Kaoru Uchida, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 110 days.

(21) Appl. No.: 12/999,970

(22) PCT Filed: Jun. 18, 2009

(86) PCT No.: PCT/JP2009/061538
§ 371 (c)(1),
(2), (4) Date: Dec. 17, 2010

(87) PCT Pub. No.: WO2009/157493
PCT Pub. Date: Dec. 30, 2009

(65) Prior Publication Data
US 2011/0099248 A1 Apr. 28, 2011

(30) Foreign Application Priority Data
Jun. 25, 2008 (JP) ................................ 2008-165197

(51) Int. Cl.
*G06F 15/16* (2006.01)
*G06F 21/57* (2013.01)
*G06F 21/88* (2013.01)

(52) U.S. Cl.
CPC ............... *G06F 21/57* (2013.01); *G06F 21/88* (2013.01)
USPC ............................ 709/218; 709/217; 709/219

(58) Field of Classification Search
CPC ......... G06F 21/57; G06F 21/88; G06F 21/10; G06F 2221/074; H04L 63/102; H04L 63/105; H04L 63/10; H04L 2463/101; H04M 1/72577; H04M 1/72572; H04M 2250/04; H04M 2250/10
See application file for complete search history.

(56) References Cited

U.S. PATENT DOCUMENTS

| 5,489,103 | A | * | 2/1996 | Okamoto | ........................ 463/29 |
| 2005/0286883 | A1 | * | 12/2005 | Abe et al. | ...................... 396/266 |

(Continued)

FOREIGN PATENT DOCUMENTS

| JP | 2002-24740 A | 1/2002 |
| JP | 2002-112214 A | 4/2002 |

(Continued)

OTHER PUBLICATIONS

Japanese Office Action for JP Application No. 2010-518043 mailed on Nov. 19, 2013 with English Translation.

(Continued)

*Primary Examiner* — Wing F Chan
*Assistant Examiner* — Padma Mundur
(74) *Attorney, Agent, or Firm* — Sughrue Mion, PLLC (57) ABSTRACT

Provided is an information processing system capable of preventing leakage of business data from an information device for personal use such as a portable telephone and false access to an in-house system. The information processing system includes an information device for personal use having a control means and server device having an individual data holding means for holding individual data transferred to the information device, and accessible by the information device and a relation data holding means for holding data about the relation between the status of the information device of when access to each set of the individual data is requested and the operation permitted about the set of the individual data. The information device transmits the status thereof to the server, and the server transfers individual data to the information device if permitted. The control means makes a control not to perform an operation other than the operations represented by the relation data and permitted.

14 Claims, 9 Drawing Sheets

(56) References Cited

U.S. PATENT DOCUMENTS

| | | | |
|---|---|---|---|
| 2006/0168259 A1* | 7/2006 | Spilotro et al. | 709/229 |
| 2007/0201682 A1* | 8/2007 | Niimi | 379/355.02 |
| 2008/0134347 A1* | 6/2008 | Goyal et al. | 726/29 |
| 2009/0217344 A1* | 8/2009 | Bellwood et al. | 726/1 |

FOREIGN PATENT DOCUMENTS

| | | |
|---|---|---|
| JP | 2005-64560 A | 3/2005 |
| JP | 2005-301891 A | 10/2005 |
| JP | 2006-92170 A | 4/2006 |
| JP | 2006-197517 A | 7/2006 |
| JP | 2006-251856 A | 9/2006 |
| JP | 2006-313484 A | 11/2006 |
| JP | 2007-97023 A | 4/2007 |
| JP | 2007-199981 A | 8/2007 |
| JP | 2007-214793 A | 8/2007 |
| JP | 2008-41046 A | 2/2008 |
| JP | 2009-16254 A | 1/2009 |

OTHER PUBLICATIONS

Japanese Office Action for JP Application No. 2010-518043 mailed on Feb. 12, 2014 with Partial English Translation.

International Search Report of PCT Application No. PCT/JP2009/061538 mailed Aug. 18, 2009.

* cited by examiner

| DATA NUMBER | DATA KIND | TITLE | DATA SUBSTANCE | EXTERNAL REFERENCE | IN-HOUSE REFERENCE | IN-HOUSE STORAGE | EXTERNAL STORAGE | EXTERNAL LONGEVITY | OWNER |
|---|---|---|---|---|---|---|---|---|---|
| 1 | TELEPHONE DIRECTORY | Mr. B | 090··· | 1 | 1 | 1 | 1 | 3m | PRINCIPAL |
| 2 | IN-HOUSE DOCUMENT | PERSONNEL INFORMATION | PERSONNEL RELATING INFORMATION | 1 | 1 | 1 | 0 | | HUMAN RESOURCES DEPARTMENT |
| 3 | PRESENTATION FILE | PROPOSAL DATA | PROPOSAL FOR C COMPANY | 1 | 1 | 1 | 1 | 1d | E MANAGER |
| 4 | SCHEDULE | 7/23 | VISITING EXHIBITION | 1 | 1 | 1 | 1 | 30d | PRINCIPAL |
| 5 | IN-HOUSE DOCUMENT | CUSTOMER INFORMATION | CUSTOMER TOP SECRET INFORMATION | 1 | 0 | 0 | 0 | 0 | D SENIOR MANAGER |
| ··· | ··· | ··· | ··· | ··· | ··· | ··· | ··· | ··· | ··· |

Fig.5

| Function Number | Function | Operation | Substance: Detail of operation/code of download-application | External Execution | In-House Execution | In-House Storage | External Storage | External Longevity | Owner |
|---|---|---|---|---|---|---|---|---|---|
| 1 | CAMERA | STORAGE IN TERMINAL | SHOOTING + TERMINAL STORAGE | 0 | 1 | | | | MANAGEMENT DEPT |
| 2 | CAMERA | STORAGE IN SERVER | SHOOTING + SERVER STORAGE | 1 | | | | | MANAGEMENT DEPT |
| 3 | BROWSER | IN-HOUSE PAGE | IN-HOUSE SERVER ACCESS BY BROWSER | 1 | 0 | | | | MANAGEMENT DEPT |
| 4 | READING OUT SD CARD | | READING OUT SD CARD | 0 | 1 | | | | MANAGEMENT DEPT |
| 5 | WRITING INTO SD CARD | | WRITING INTO SD CARD | 0 | | 1 | | | MANAGEMENT DEPT |
| 6 | DOWNLOAD-APPLICATION | CREATING ESTIMATE SHEET | CODE FOR APPLICATION OF CREATING ESTIMATE SHEET FOR CUSTOMER | 1 | 1 | 1 | 0 | | MANAGEMENT DEPT |
| 7 | DOWNLOAD-APPLICATION | MANIPULATION OF CUSTOMER DATABASE | CODE FOR APPLICATION OF MANIPULATION OF TOP SECRET CUSTOMER DATABASE | 1 | 0 | 0 | 1 | 30d | MANAGEMENT DEPT |
| ... | ... | ... | ... | ... | ... | ... | ... | ... | ... |

INFORMATION PROCESSING SYSTEM, SERVER DEVICE, INFORMATION DEVICE FOR PERSONAL USE, AND ACCESS MANAGEMENT METHOD

This application is the National Phase of PCT/JP2008/061538, field Jun. 18, 2009, which is based upon and claims the benefit of priority from Japanese patent Application No. 2008-165197, on Jun. 25, 2008, the disclosure of which is incorporated herein in its entirety by reference.

TECHNICAL FIELD

The present invention relates to an information processing system, a server device, an information device for personal use and an access management method. In particular, the present invention relates to an access management of data and function in a portable telephone terminal.

BACKGROUND ART

For the use of an information processing system relating to the present invention, a company subscribes a portable telephone terminal and makes an employee use the portable telephone terminal for a business use. In this case, it is necessary for an administrator of the company to establish a policy about use method of the portable telephone terminal and discipline the employees to this policy.

When a portable telephone terminal is used for business purposes, it is required to strike a balance between convenience of business data access inside of the company and a security measure which prevents a data leakage at outside the company. As a system of this kind, there has been the one described in the following patent document 1. In a system described in patent document 1, according to a data designated condition which was designated and transmitted from a portable telephone terminal, a server generates a web page which includes data corresponding to the data designated condition and makes the web page shown on a display of the portable telephone terminal.

When a portable telephone terminal has the data processing function for such as the document, the user may store data in the portable telephone terminal and process it. Or, the user may acquire data on the server in the company using a communication function of a portable telephone terminal and process the data. Further, when a portable telephone terminal has a browser function, the user may connect it to a system in the company and browses information on the server.

Patent document 1: Japanese Patent Application Laid-Open No. 2002-024740
Patent document 2: Japanese Patent Application Laid-Open No. 2005-064560
Patent document 3: Japanese Patent Application Laid-Open No. 2006-313484
Patent document 4: Japanese Patent Application Laid-Open No. 2007-097023

DISCLOSURE OF THE INVENTION

Technical Problem

However, when the in-house business data above-mentioned is used outside of the company, an information processing system relating to the present invention has a great deal of fear of a secret leakage by a stealthy glance or by loss and theft of a portable telephone terminal. Therefore, it is necessary that the user disciplines the policy such as to limit the access to business data only when he is in the inside of the company or not to take out the secret data outside the company while storing in the portable telephone terminal. For the use of an information processing system relating to the present invention, the user has to abide by the above-mentioned policy, consciously. For this reason, there has been a fear that a leakage accident happens by taking data out unjustly by the malicious user, or by bringing out in-house data stored in the portable telephone terminal outside the company carelessly and losing the terminal. Even a system described in the above-mentioned patent document 1 cannot settle this problem.

Accordingly, it is an object of the present invention to eliminate the above-mentioned problem and to provide an information processing system, a server, an information device for personal use and an access management method which can prevent false access to in-house system and a leakage of business data in an information device for personal use such as a portable telephone.

Technical Solution

An information processing system according to an exemplary aspect of the present invention includes:
an information device for personal use having control means; and
a server device which includes
individual data holding means for holding individual data which is transmitted to the information device for personal use and accessible from the information device for personal use, and relation data holding means for holding relation data between a state of the information device for personal use at the time of an access request and an operation permitted for the individual data at the time, for the each individual data,
wherein
the information device for personal use transmits the state of the information device for personal use to the server;
the server transmits the individual data to the information device for personal use if permitted; and
the control means controls not to execute any operation besides the operation described in the relation data with the permission.

Another information processing system according to an exemplary aspect of the present invention includes:
an information device for personal use having control means; and
a server device which includes
function holding means for holding a function which is transmitted to the information device for personal use and executable in the information device for personal use, and relation data holding means for holding relation data between a state of the information device for personal use at the time of an execution request and a function permitted to execute at the time for the each function,
wherein
the information device for personal use transmits the state of the information device for personal use to the server;
the server transmits the function to the information device for personal use if permitted; and
the control means controls to execute the function with the permission.

A server device according to an exemplary aspect of the present invention includes:
individual data holding means for holding individual data which is transmitted to an information device for personal use and accessible from the information device for personal use; and relation data holding means for holding relation data between a state of the information device for personal use at the time of an access request and an operation permitted for the individual data at the time for the each individual data, and the individual data is transmitted to the information device for personal use if permitted.

An information device for personal use according to an exemplary aspect of the present invention is connected to a server device which includes:

individual data holding means for holding individual data which is transmitted to the information device for personal use and accessible from the information device for personal use; and relation data holding means for holding relation data between a state of the information device for personal use at the time of an access request and an operation permitted for the individual data at the time, for the each individual data, transmits the state of the information device for personal use to the server, and includes a control means for controlling not to execute any operation besides the operation described in the relation data with the permission.

An access management method according to an exemplary aspect of the present invention includes:

holding, by a server device, individual data which is transmitted to an information device for personal use and accessible from the information device for personal use;

holding, by a server device, relation data between a state of the information device for personal use at the time of an access request and an operation permitted for the individual data at the time, for the each individual data; and executing, by the information device for personal use, a process to control not to execute any operation besides the operation described in the relation data with the permission.

Another access management methods according to an exemplary aspect of the present invention includes:

holding, by a server device, a function which is transmitted to a information device for personal use and executable in the information device for personal use;

holding, by a server device, relation data between a state of the information device for personal use at the time of an execution request and a function permitted to execute at the time for the each function; and executing, by the information device for personal use, a process for controlling an execution of function with the permission.

ADVANTAGEOUS EFFECTS

The present invention can prevent a leakage of business data in an information device for personal use such as a portable telephone and false access to an in-house system.

EXPLANATION OF REFERENCE 1,3,5 Portable Telephone Terminal
2,4,6 Server
11 User Interface Unit
12 Terminal Data Storage Unit
13 Terminal Data Processing Unit
14 Terminal Processing Management Unit
15,21,31,42 Communication Unit
16 Usage State Management Unit
22 Server Processing Management Unit
23 Server Data Processing Unit
24 Server Data Storage Unit
32 Connection State Management Unit
51 Control Unit
61 Individual Data
62 Relation Data
A Display

BEST MODE FOR CARRYING OUT THE INVENTION

An exemplary embodiment of the present invention will be described with reference to drawings hereafter.

First, an outline of an information processing system according to the first exemplary embodiment of the present invention will be described. The information processing system according to the first exemplary embodiment of the present invention provides the function for preventing leakage of business data and false access to an in-house system in an information device for personal use such as a portable telephone. Specifically, the information processing system according to the first exemplary embodiment of the present invention is characterized in that it enables an administrator of an information system of a company to set separately whether access and execution to data and the function are possible inside or outside the company, for each data or function.

The information processing system of this exemplary embodiment includes an information device for personal use which the user possesses and uses, and a server for holding substance of data to which an access should be managed. When the user accesses (reads and writes) data from the information device for personal use, the user basically accesses to the data held in a server.

The information processing system of this exemplary embodiment provides the function for forcing to comply with policy about data access and function execution which the administrator of the information system of the company establishes. Specifically, for each data or function, the administrator can set separately whether access and execution can be performed only at the inside of the company or can be also performed at the outside of the company.

Figure 1:
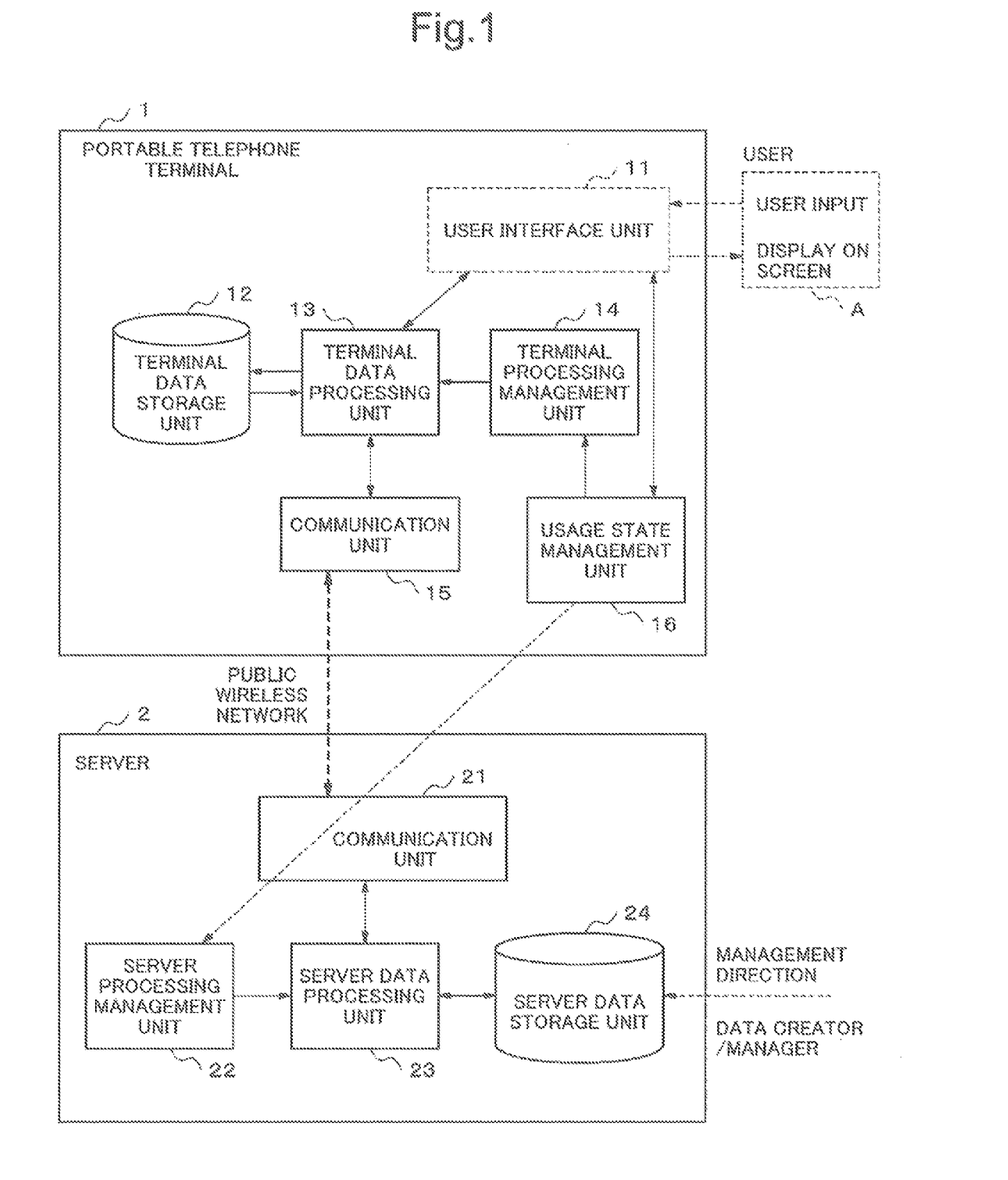
FIG. 1 is a block diagram showing a configuration example of an information processing system according to the first exemplary embodiment of the present invention.

FIG. 1 is a block diagram showing an exemplary configuration of the information processing system according to the first exemplary embodiment of the present invention. In FIG. 1, the information processing system according to the first exemplary embodiment, of the present invention includes a portable telephone terminal (information device for personal use) 1 which a user such as an employee possesses and uses, and a server 2, which is managed by a company for example, and performs safekeeping and processing of business data. The portable telephone terminal 1 is bought and subscribed to by the company for example, and loaned to the user. The server 2 is connected with the portable telephone terminal 1 via a public wireless network. Further, any kind of connection means which can support data communication is applied.

The portable telephone terminal 1 includes a user interface unit 11, a terminal data storage unit 12, a terminal data processing unit 13, a terminal processing management unit 14, a communication unit 15 and a usage state management unit 10. Further, although not being illustrated, the portable telephone terminal 1 includes a CPU (Central Processing Unit) which controls the terminal in whole and a storage unit for storing a program which CPU executes.

The user interface unit 11 of the portable telephone terminal 1 accepts input from the user via a key input unit (not shown) such as a numerical keypad. The user interface unit 11 also displays an output to the user on the display A such as a display screen. The terminal data processing unit 13 processes stored data according to the directions of the user from the portable telephone terminal 1. In other words, the terminal data processing unit 13 executes such as the following process:

(1) Accessing (such as reads and edits) data on the server 2 via a communication function which the communication unit 15 provides, (2) Accessing data stored in the terminal data storage unit 12, (3) Executing a function of the portable telephone terminal 1 such as a camera operation, and browsing and storing data (for example, stores an image taken by a camera), and (4) Downloading and executing a dedicated small program (it is called download-application, here) from the server 2.

The portable telephone terminal 1 performs the following processing when data access such as file browsing is performed. First, it requests a transmission of data to the server 2 via the communication unit 15. Next, it outputs data which is sent from the server 2, from the terminal data processing unit 13 to the user interface unit 11, and performs a processing such as displaying on the display A. As will be described later, regarding the data which is permitted to be stored in the portable telephone terminal 1, the portable telephone terminal 1 stores a copy of this data temporarily in the terminal data storage unit 12 in order to use the data continuously even when communication is disconnected.

The usage state management unit 16 executes determination and management of whether the portable telephone terminal 1 is being used as an in-house mode at present or an external mode. For example, the usage state management unit 16 will be the in-house mode when the user performs login operation by using authentication with a password through the user interface unit 11, and be the external mode when the user performs logout operation. The terminal processing management unit 14 manages the operation of the terminal data processing unit 13 so that being operated accordingly to the mode at that time such as the in-house/external mode, which the usage state management unit 16 outputs.

The server 2 may be placed in the company and a carrier may provide only a communication unit 21. Or, the server 2 may be managed by service providers and hold and manage the data of a contract company and user, and provide communications. The server 2 includes the communication unit 21, a server processing management unit 22, a server data processing unit 23 and a server data storage unit 24. Further, although not being illustrated, the server 2 includes a CPU, which controls the whole apparatus, and a memory unit for storing a program, which CPU executes. The server data processing unit 23 of the server 2 sends data required for a processing operation of the portable telephone terminal 1 or a function execution instruction or the like of the portable telephone terminal 1 to the portable telephone terminal 1. By this sending, the server data processing unit 23 supports processing of the portable telephone terminal 1 by sharing and cooperating with the portable telephone terminal 1. In that case, the server processing management unit 22 manages operation of the server data processing unit 23 so that it may operate accordingly to the in-house/external mode which the usage state management unit 16 outputs. The server data storage unit 24 holds a processing data, a code of a processing application, and a management policy of the data processing and the function performance for each portable telephone terminal 1 on the server 2.

Figure 2:
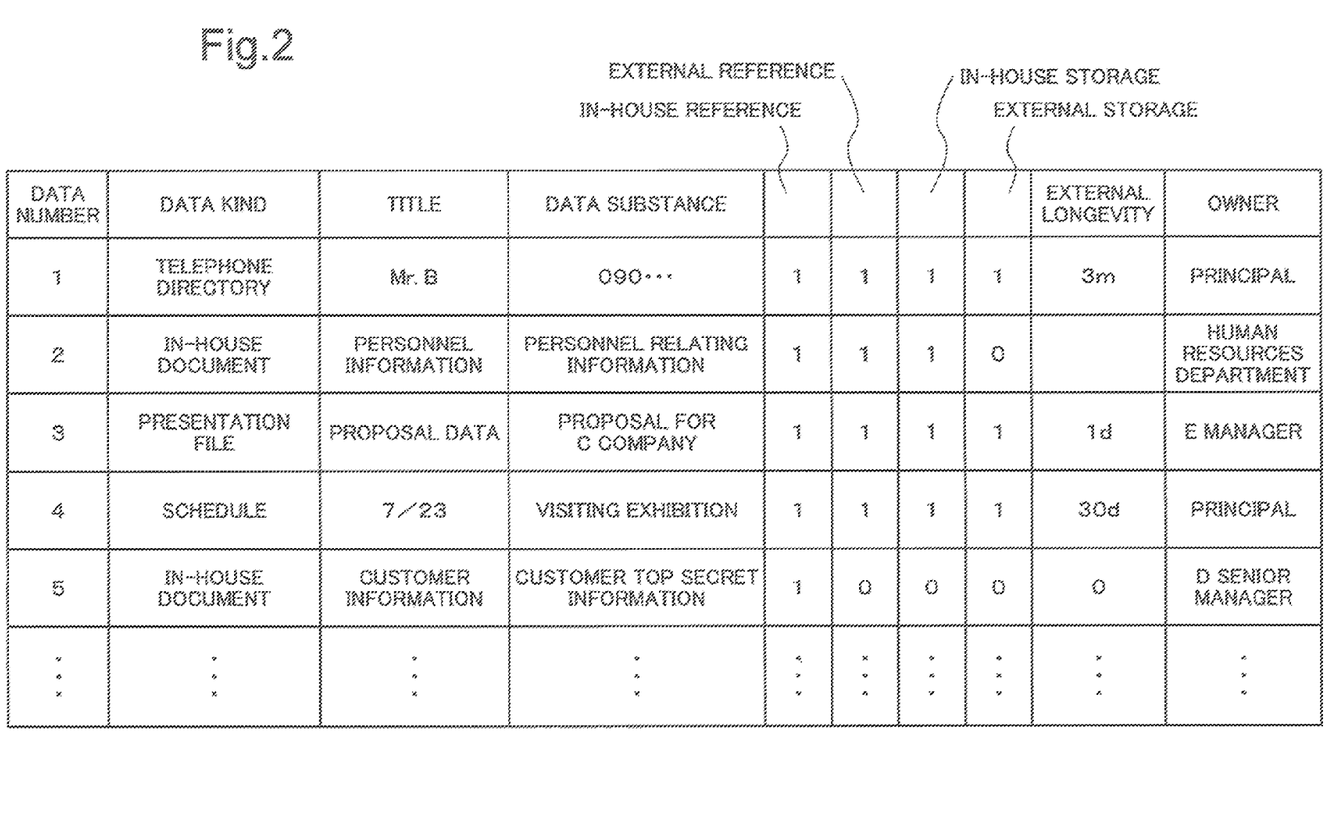
FIG. 2 shows a configuration example of a table in a server data storage unit shown in FIG. 1.

FIG. 2 shows an exemplary configuration of a table in the server data storage unit 24 of FIG. 1.

In FIG. 2, data in the server data storage unit 24 and its management policy are stored in the table. Each line of this table corresponds to individual data which should be managed such as one entry of a telephone directory and one electronic file.

The main body of data, which is a content of a telephone directory or a file, is stored in an area of data substance.

A field of in-house reference will be "1" if the data can be referred to by the in-house mode, and will be "0" if it cannot be. A field of an external reference will be "1" if the data can be referred to by the external mode, and will be "0" if it cannot be.

A field of in-house storage will be "1" if the data can be stored in the portable telephone terminal 1 under the in-house mode, and will be "0" if it cannot be. A field for storing outside the company will be "1" if the data can be stored in the portable telephone terminal 1. under the external mode, and will be "0" if it cannot be.

A field of the longevity outside the company shows that how long the data can be stored after data is held in the portable telephone terminal 1 when in the case the data can be stored in the portable telephone terminal 1 with the external mode and if the portable telephone terminal 1 is in the external mode. It means a capable holding limit for example, "3m" for 3 minutes, "30d" for 30 days and "99" for not specific limit. When this time limit is exceeded, the data in the terminal data storage unit 12 is eliminated by management directions of the terminal processing management unit 14. An owner field shows who has authority to set and change this management policy.

Figure 3:
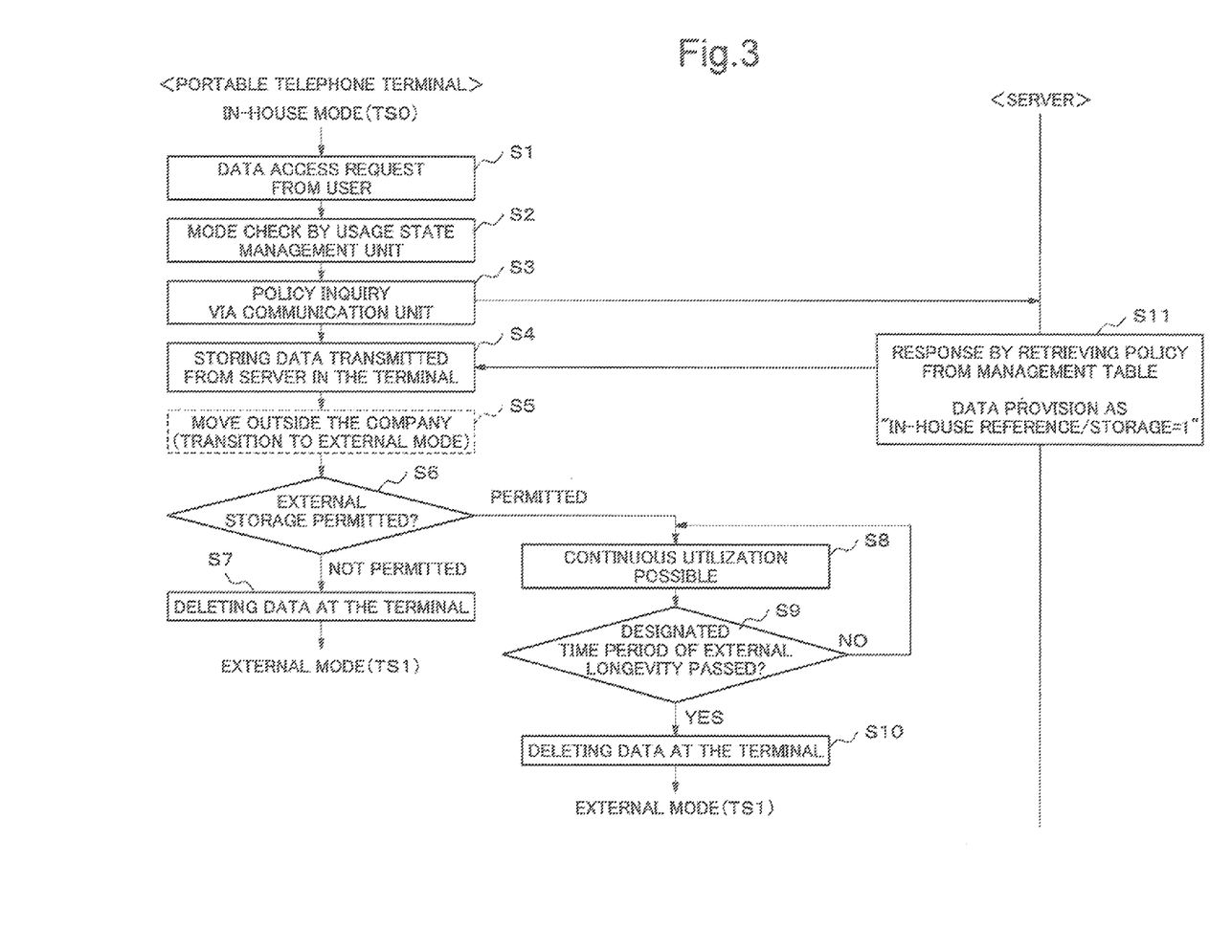
FIG. 3 is a sequence chart showing operation of an information processing system according to the first embodiment of the present invention.
Figure 4:
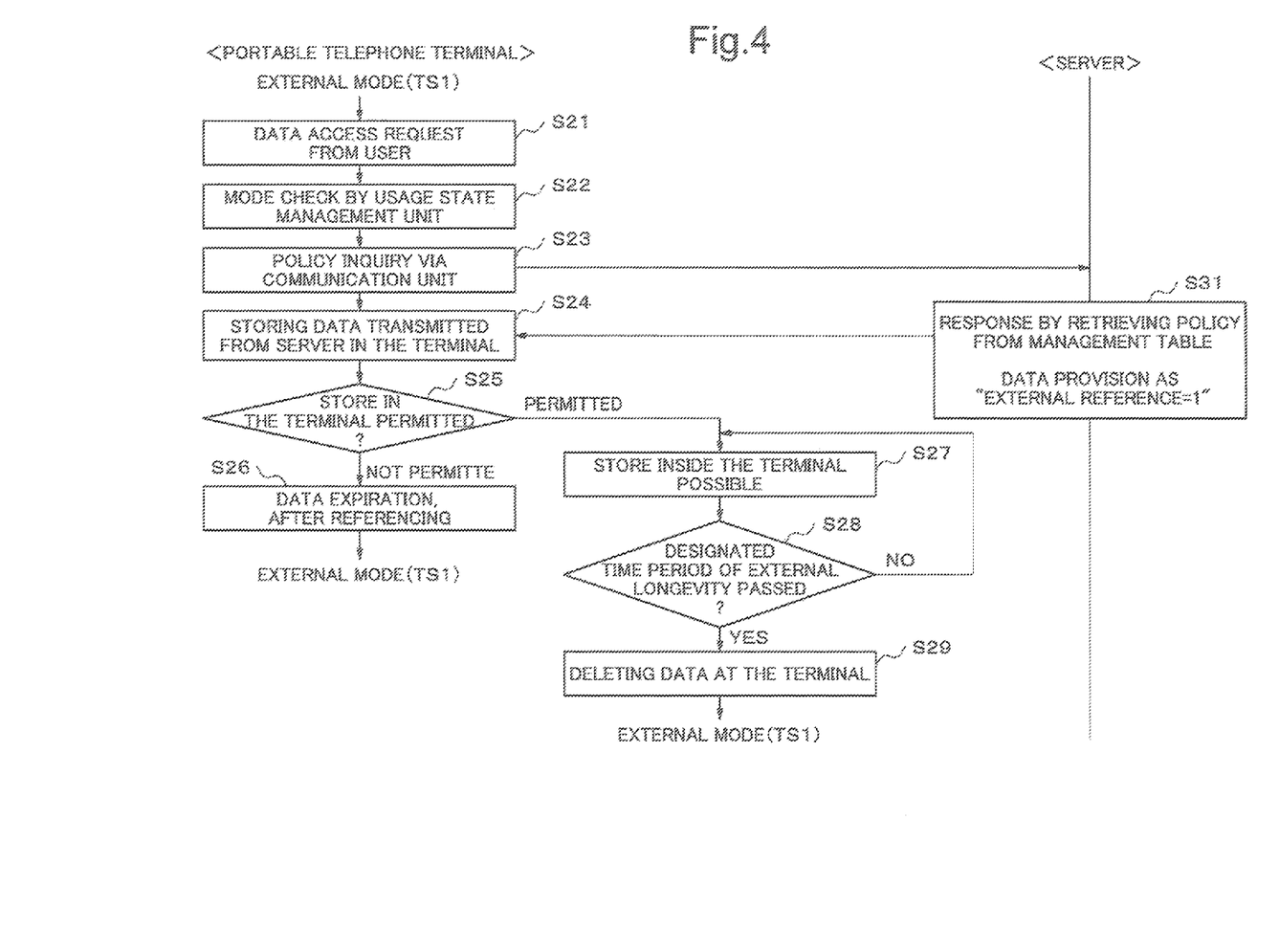
FIG. 4 is a sequence chart showing operation of an information processing system according to the first exemplary embodiment of the present invention.

FIG. 3 and FIG. 4 are sequence charts showing operation of the information processing system according to the first exemplary embodiment of the present invention. Operation of the information processing system according to the first exemplary embodiment of the present invention will be described with reference to these FIG. 1 to FIG. 4. Further, a processing operation of the portable telephone terminal 1 in FIG. 3 and FIG. 4 is realized by executing a program, which is stored in the memory unit by the CPU of the portable telephone terminal 1. Similarly, a processing operation of the server 2 in FIG. 3 and FIG. 4 is realized by executing a program, which is stored in the memory unit by the CPU of the server 2.

The user performs login operation by inputting a user name and a password (or, personal identification number) in an in-house information system by the user interface unit 11 of the portable telephone terminal 1 when utilizing data and the function with the in-house mode inside of the company.

When the rightness of the login operation is confirmed with the portable telephone terminal 1, the portable telephone terminal 1 stores in the usage state management unit 16 that an operation mode is the in-house mode. On the contrary, when the user brings the portable telephone terminal 1 outside the company, the user performs logout, processing and makes the operation mode of the portable telephone terminal 1 the external mode.

The usage slate management unit 16 discriminates the current operation mode of the portable telephone terminal 1 as the in-house mode if the last operation is login and as the external mode if the last operation is logout.

When the user requests access of data and execution of the function via the user interface unit 11, the current mode stored in the usage state management unit 16 is referred to. When the current, mode is the in-house mode, access and execution are permitted if the policy in the line indicates that "in-house reference is equal to 1", but they will not be permitted if it is not.

Likewise, when the current mode is the external mode, access and execution are permitted if the external reference is equal to 1, but they will not be permitted if it is not. When permitted, if the terminal storage of the data is equal to 1, the user can store a copy of the data in the terminal data storage unit 12 in the portable telephone terminal 1 in the range of time period specified in the longevity outside the company.

FIG. 3, as an example of a flow of operation, indicates operation of the portable telephone terminal 1 and the server 2, when the access to the data in the server 2 is executed according to the request by the user from the portable telephone terminal 1 which is in the company and under login condition.

In the portable telephone terminal 1, first, when a data access request from the user is invoked (step S1 of FIG. 3), the usage state management unit 16 discriminates whether it is the in-house mode or the external mode currently (step S2 of FIG. 3). Next, the portable telephone terminal 1 sends an inquiry about the management policy of the data to the server 2 via the communication unit 15 (step S3 of FIG. 3).

When the server 2 receives the inquiry message of the management policy from the portable telephone terminal 1 via the communication unit 21, the server 2 confirms the management policy about the data with reference to entry of the data in the management table in the server data storage unit 24 with the server processing management unit 22. The server 2 sends the whole entry including the substance of the data and the management policy or the like to the portable telephone terminal 1 if a reference by the present mode is permitted (step S11 of FIG. 3).

When the data (the whole entry) is being sent from the server 2, the portable telephone terminal 1 stores the data in the terminal data storage unit 12. And the portable telephone terminal 1 provides the substance of the data for the user use (step S4 of FIG. 3).

In FIG. 3, the data is provided for the portable telephone terminal 1 from the server 2 since it is the in-house mode and in-house reference is equal to 1. The data can be also stored in the terminal data storage unit 12 of the portable telephone terminal 1 since in-house storage is equal to 1.

After this, when the user executes logout operation for taking the portable telephone terminal 1 outside the company, the portable telephone terminal 1 transits to the external mode (step S5 of FIG. 3). When storage outside the company is not permitted by the management policy of the data (step S6 of FIG. 3), the portable telephone terminal 1 will further eliminate data from the terminal data storage unit 12 immediately by directions of the terminal processing management unit 14 (step S7 of FIG. 3).

This case, for example, corresponds to the case in which the data is data number "2" and "personnel related information" which is shown in FIG. 2. Another example, in which data cannot be stored in the portable telephone terminal 1 beside only on-line reading even if it is in the in-house mode with "in-house storage=0", is the data number "5" and "customer information" in FIG. 2.

On the other hand, the portable telephone terminal 1 is eligible to refer and keep storing continuously until the time passing out of the time period which is designated by "the external longevity" if the external reference or the external storage is permitted (steps S8 and S9 of FIG. 3). When the time designated by "the external longevity" passes (step S9 of FIG. 3), the portable telephone terminal 1 will eliminate data from the terminal data storage unit 12 immediately by the directions of the terminal processing management unit 14 (step S10 of FIG. 3).

This is a flow, for example, in the case in which storing the data number "3" and "proposal for C company" in FIG. 2 in the portable telephone terminal 1 while it is in the inside of the company, visiting C company and using it for a explanation and be deleted automatically 1 day later.

FIG. 4, as another example of a flow of operation, indicates operation of the portable telephone terminal 1 when the access to the data in the server 2 is executed with the request by the user from the portable telephone terminal 1 which is outside of the company and under logout condition.

Referring to FIG. 4, at first, data is provided for the portable telephone terminal 1, which is outside of the company, from the server 2 since it is in the external mode and the external reference is equal to 1. And browsing the data becomes possible (steps S21 to S24 and S31 of FIG. 4).

Next, the portable telephone terminal 1. determines whether it is possible to store this data in the terminal data storage unit 12 (step S25 of FIG. 4). By the policy of the data, if storing to the portable telephone terminal 1 is not permitted, this data cannot be stored in the terminal data storage unit 12 (step S26 of FIG. 4) although it can be browsed at the place for the certain time period.

On the other hand, if it is permitted to store this data to the terminal data storage unit 12, the portable telephone terminal 1 can store this data. And this data remains accessible as the data inside the terminal (steps S27 and S28 of FIG. 4) until the time designated in "the external longevity" of the data passes after the storage operation. When designated time passes, the portable telephone terminal 1 eliminates the data from the terminal data storage unit 12 (step S29 of FIG. 4).

This is a flow, for example, in that, for making a call to Mr. B, inquiring the "telephone directory data of Mr. B" with the data number "1" in FIG. 2 to the server 2 from outside of the company, storing it in the portable telephone terminal 1 until making a call and deleting it automatically 3 minutes later are processed.

As is explained, according to this exemplary embodiment, the administrator of the information system of the company can set whether access and execution inside or outside of the company are permitted or not for each data separately. By this thing, an information processing system according to the first exemplary embodiment of the present invention can prevent leakage of business data and false access to an in-house system in an information device for personal use such as a portable telephone.

Figure 5:
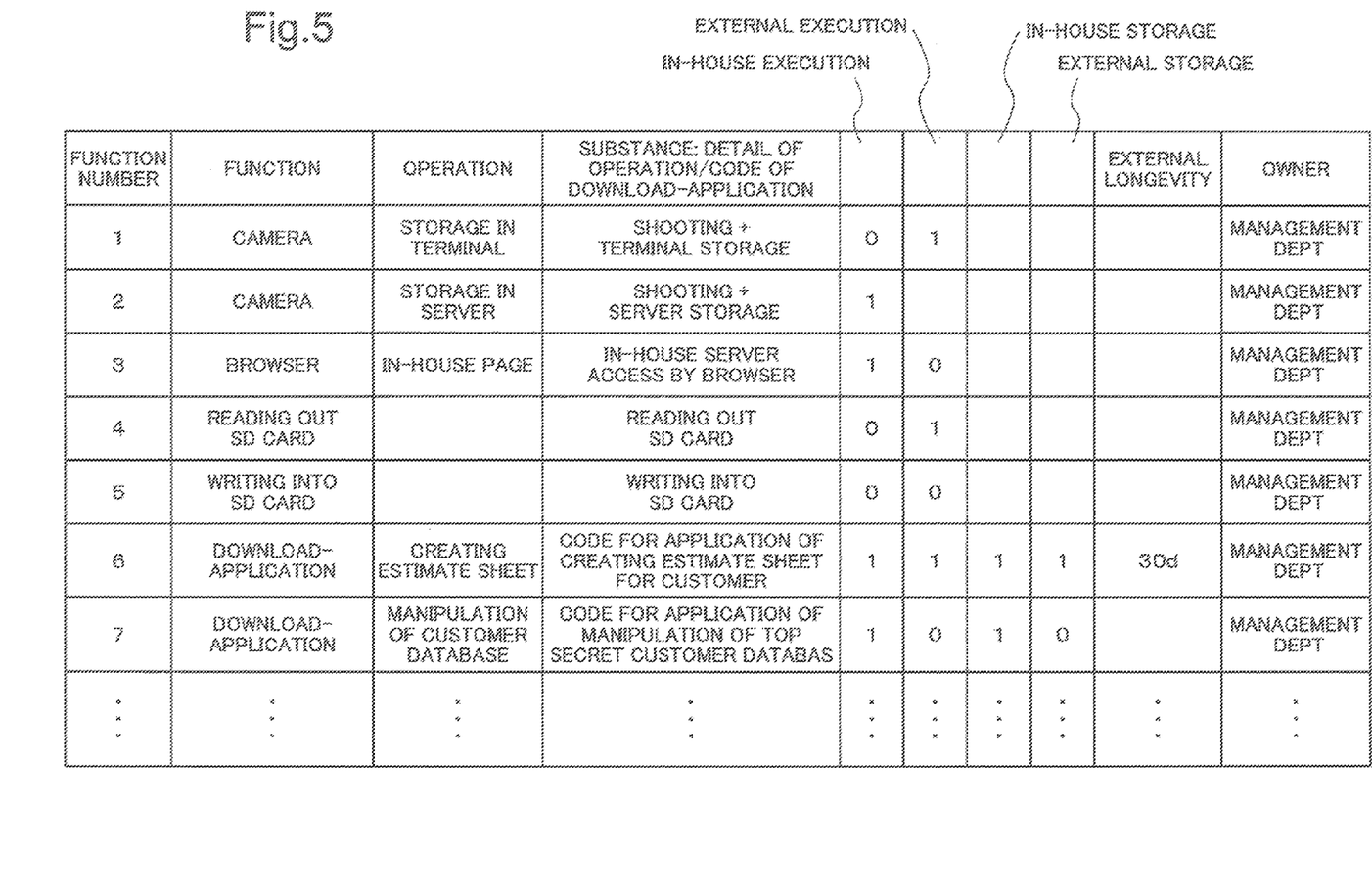
FIG. 5 shows a configuration example of a table in a server data storage unit according to the second embodiment of the present invention.

FIG. 5 shows an exemplary configuration of a table in the server data storage unit according to the second exemplary embodiment of the present invention. In FIG. 5, the table holds the management policy of the function in the server data storage unit according to the second exemplary embodiment of the present invention. Further, each configuration of an information processing system, a portable telephone terminal and a server according to the second exemplary embodiment of the present invention is the same as that of the first exemplary embodiment of the present invention shows in FIG. 1.

Each line of the table of the server data storage unit 24 corresponds to the individual function of the portable telephone terminal 1 and application to be downloaded. The description of an operation which is management target and the main part of code of download-application are held in an area of substance. A field of in-house execution is "1," if the data is executable in the in-house mode, and "0" if it is not. A field of external execution is "1" if the data is executable in the external mode, and "0" if it is not.

In case of download-application, "executable" means that whether it is possible to download from the server 2 to the portable telephone terminal 1 and carry out it or not. Following three fields relate to download-application. A field of in-house storage is "1" if the download-application can be stored in the portable telephone terminal 1 in the in-house mode and "0" if it is not. A field of external storage is "1" if the download-application can be stored in the portable telephone terminal 1 in the external mode and "0" if it is not. A field of the longevity outside the company shows that how long the download-application can be stored after download-application is held in the portable telephone terminal 1 when in the case the download-application can be stored in the portable telephone terminal 1 with an external mode and if the portable telephone terminal 1 is in the external mode. When this time limit is exceeded, the download-application is eliminated by management directions of the terminal processing management unit 14. An owner field shows who has authority to set and change this management policy.

Figure 6:
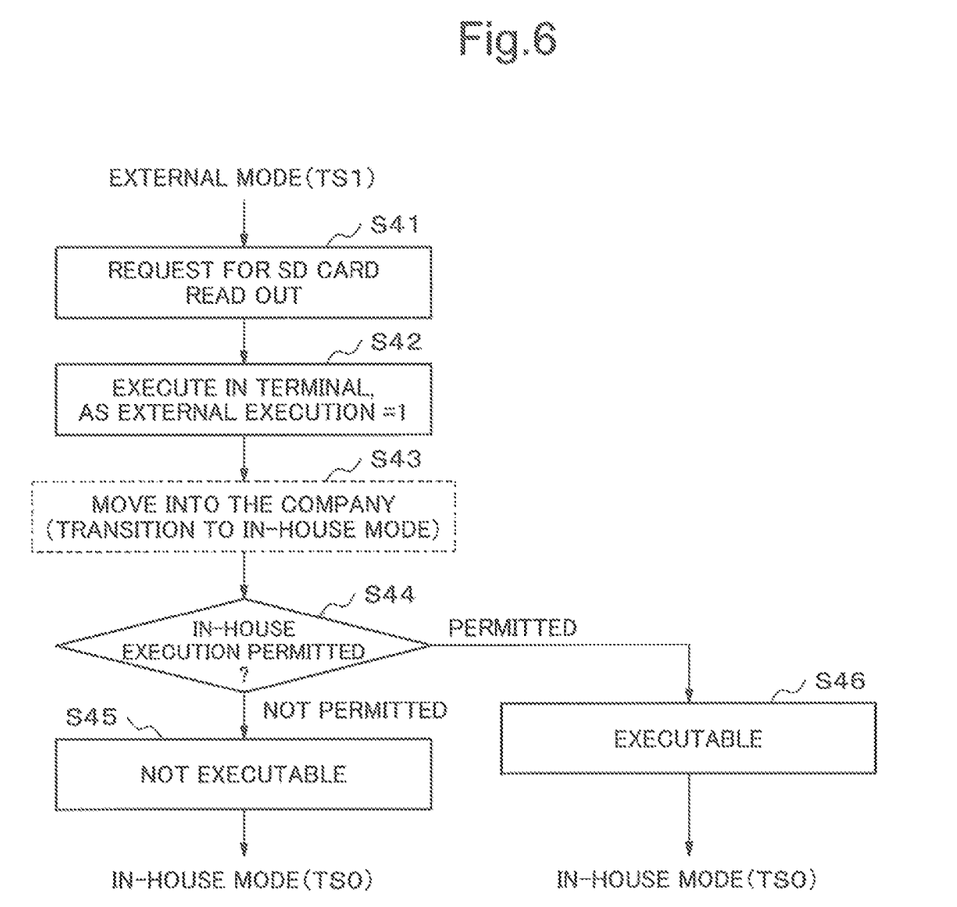
FIG. 6 is a flowchart showing operation of a portable telephone terminal according to the second exemplary embodiment of the present invention.
Figure 7:
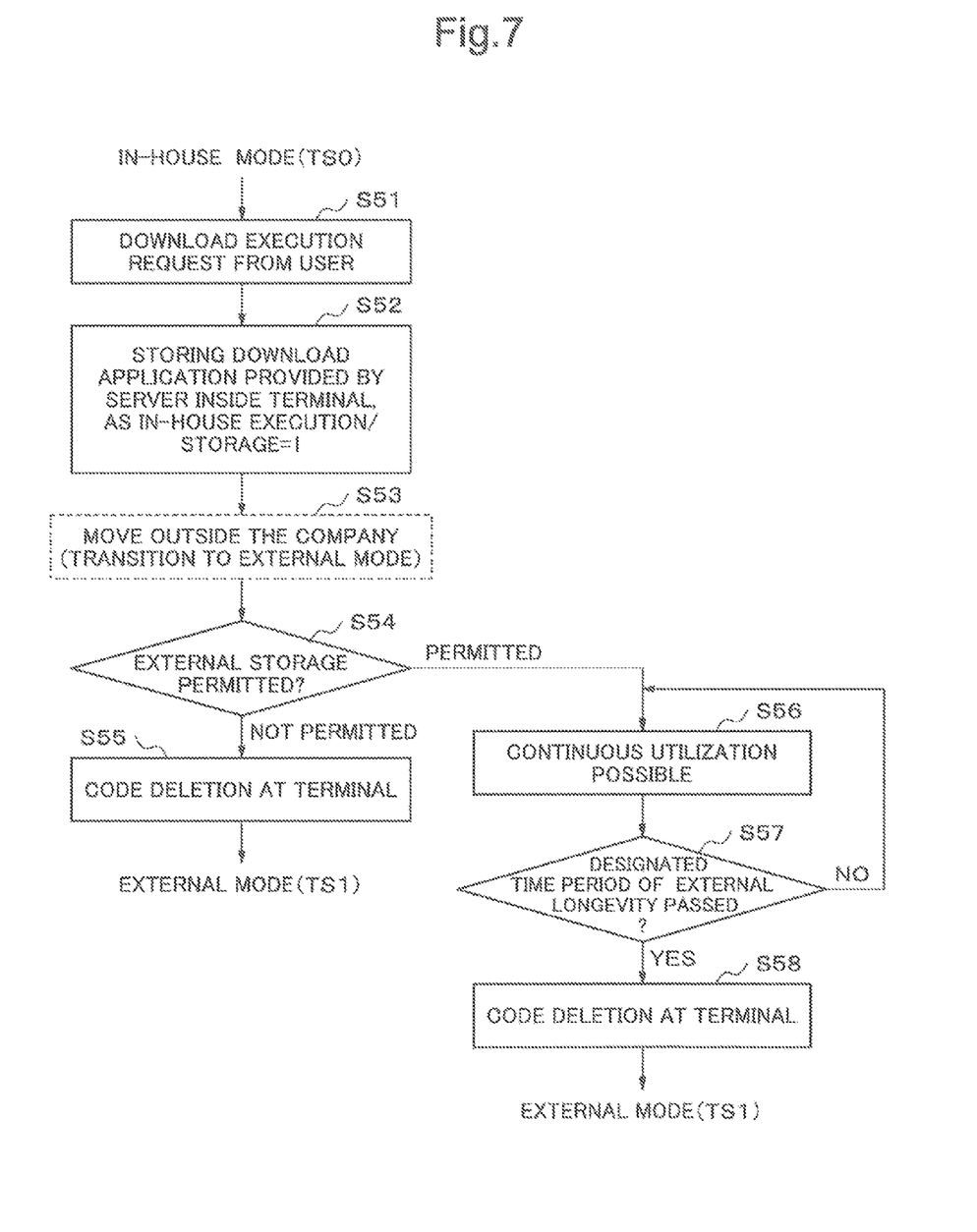
FIG. 7 is a flowchart showing operation of a portable telephone terminal according to the second exemplary embodiment of the present invention.

FIG. 6 and FIG. 7 are flowcharts showing operation of the portable telephone terminal 1 according to the second exemplary embodiment of the present invention. Operation of the information processing system according to the second exemplary embodiment of the present invention will be described with reference to these FIG. 1 and FIGS. 5 to 7. Further, operation shown in FIG. 6 and FIG. 7 is realized by executing a program, which is stored in the memory unit with the CPU of the portable telephone terminal 1.

As an example of a flow of operation, a flow of operation when reading SD (Secure Digital) card which is borrowed from a person while outside of the company is shown in FIG. 6. When a function execution request from the user arises, the portable telephone terminal 1 determines whether it is currently in the in-house mode or the external mode in the state management unit 16.

Next, the portable telephone terminal 1 refers the management policy about the function and permits execution with the portable telephone terminal 1 if the execution in the mode is permitted. In this FIG. 6, reading in SD card is executed since the mode is external and external execution is equal to 1 (steps S41 and S42 of FIG. 6).

Next, if the user moves into the company and performs login operation, the portable telephone terminal 1 will be an in-house mode (step S43 of FIG. 6). If the in-house execution is prohibited (step S44 of FIG. 6), the portable telephone terminal 1 cannot read in the SD card (step S45 of FIG. 6). If the in-house execution is permitted (step S44 of FIG. 6), the portable telephone terminal 1 can read in the SD card (step S46 of FIG. 6).

This is corresponding to a case in that, for example, the user is designated to use such as a personal computer (which can be managed more effectively) inside of the company and, on the contrary outside of the company, as there is only the portable telephone terminal 1 for use and permitted to read with the emphasis on the convenience. On the other hand, writing into SD card is prohibited uniformly in this policy from a viewpoint of information leakage management.

FIG. 7 indicates a flow of operation of the portable telephone terminal 1 with the login state inside the company as an example of a flow of another operation. In FIG. 7, the portable telephone terminal 1 performs such as access to server data for download in order to download and carry out an execution code (download-application), for example, such as a Java (registered trademark) application. This is corresponding to the case, for example, the function number "6" and the function number "7" in FIG. 5.

First, when a function download request from the user inside of the company arises, the portable telephone terminal 1 determines whether it is the in-house mode or the external mode with the usage state management unit 16. Next, the portable telephone terminal 1 refers to the management policy about the function. If the download execution in the current mode is permitted, code of download-application is sent to the portable telephone terminal 1 from the server 2. And the portable telephone terminal 1 serves code of download-application to user for the use of execution.

In this FIG. 7, code of download-application is provided as the mode is in-house and in-house execution is equal to 1. In FIG. 7, code of download-application can be stored in the portable telephone terminal 1 (steps S51 and S52 of FIG. 7) as in-house storage equals to 1.

Next, if the user performs logout operation in order to take the portable telephone terminal 1 outside the company, the portable telephone terminal 1 will be the external mode (step S53 of FIG. 7). If the storage outside the company is prohibited by the policy of code of the download-application (step S54 of FIG. 7), the code of download-application will be deleted from the portable telephone terminal 1 immediately by the directions of the terminal processing management unit 14 (step S55 of FIG. 7).

On the other hand, if the execution outside the company or storage outside the company is permitted (step S54 of FIG. 7), the portable telephone terminal 1 is eligible to continue holding and executing the code (steps S56 and S57 of FIG. 7), until the time designated in "the external longevity" of the code of the download-application passes after the logout operation. And when designated time passes, the portable telephone terminal 1 deletes the code of the download-application (step S58 of FIG. 7).

As is explained, according to this exemplary embodiment, the administrator of the information system of the company can set whether access and execution inside or outside the company are permitted or not for each function separately. By this thing, an information processing system according to the second exemplary embodiment of the present invention can prevent leakage of business data and false access to an in-house system in an information device for personal use such as a portable telephone.

Figure 8:
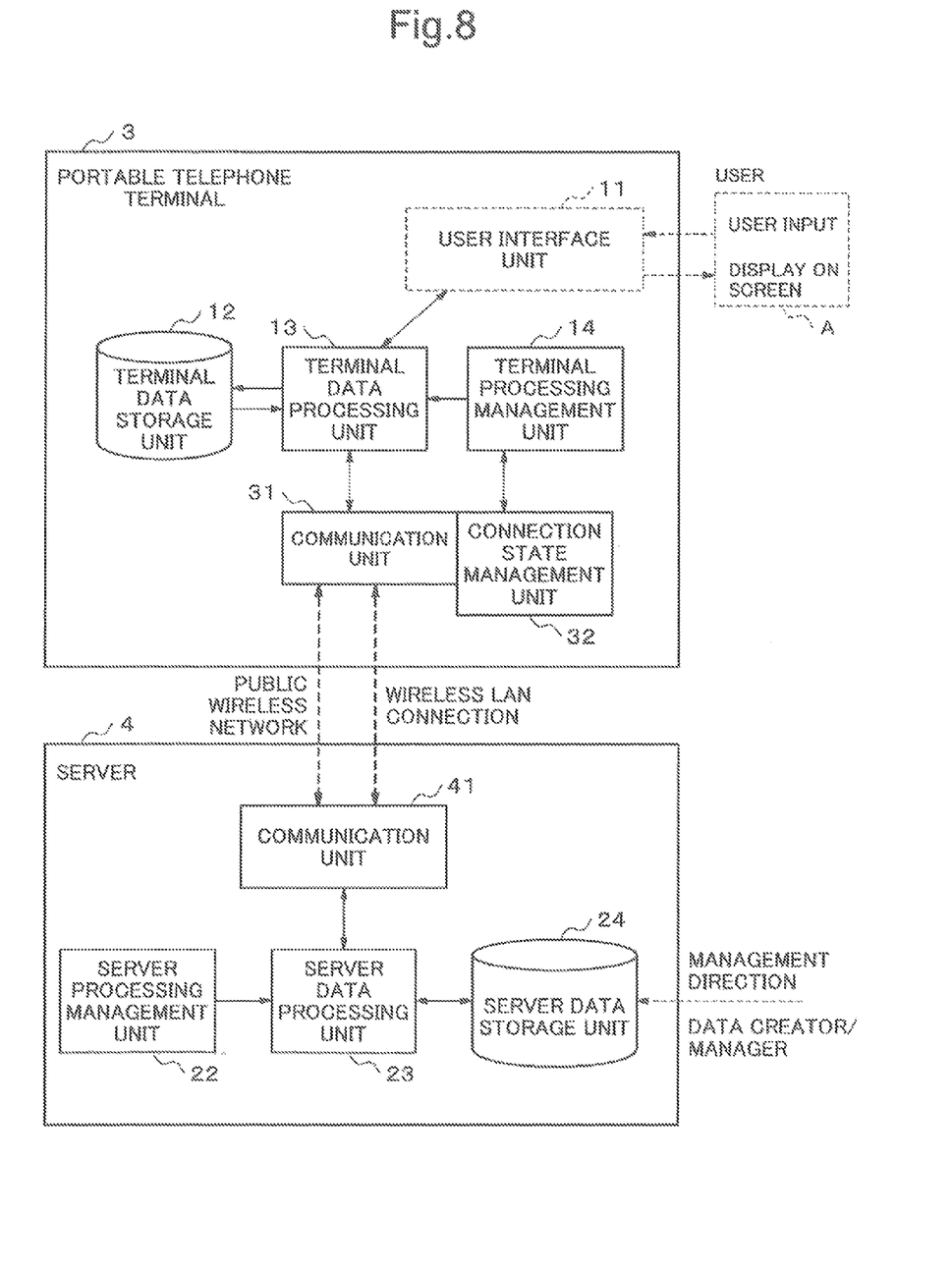
FIG. 8 is a block diagram showing a configuration example of an information processing system according to the third exemplary embodiment of the present invention.

FIG. 8 is a block diagram showing an exemplary configuration of an information processing system according to the third exemplary embodiment of the present invention. In the third exemplary embodiment of the present invention, FIG. 8 shows an automated mode determination by a WLAN (Wireless Local Area Network) dual machine.

The third exemplary embodiment of the present invention provides a communication unit 31, which has a communication function with combination of a public radio network and a wireless LAN (Local Area Network), instead of the communication unit 15 and an connection state management unit 32 instead of the usage state management unit 16, respectively in a portable telephone terminal 3. The communication unit 41, which has the communication function with combination of the public radio network and the wireless LAN, is provided on a server 4 instead of the communication unit 21. Further, other than above mentioned, the third exemplary embodiment of the present invention has the same configuration as the first exemplary embodiment of the present invention shown in FIG. 1 and the same symbol is given to the same component.

In the above-mentioned first and second exemplary embodiment of the present invention, the explicit action of user such as executing login or logout operation is required for switching the in-house mode and the external mode. For this reason, if the user forgets the logout operation while remaining in the in-house mode, brings out the portable telephone terminal 3 outside of the company and use it with violation of the policy, there might be a problem that a trouble arises on the security. On the contrary, if the user does not login even inside of the company, there might be also a problem which is an obstacle of convenience of the portable telephone terminal 3.

In the third exemplary embodiment of the present invention, a wireless LAN communication function equipped to the portable telephone terminal 3 is used for settling this problem and in order to raise the safeness and efficiency of convenience more.

The communication unit 31 of the portable telephone terminal 3 performs a wireless LAN connection with a wireless LAN equipment in the company. (Wireless LAN equipment is sometimes called a wireless communication device.) On the other hand, the connection state management unit 32 discriminates whether the portable telephone terminal 3 is currently performing the wireless LAN connection or not. In another words, the portable telephone terminal 3 operates as the in-house mode while it is in the inside of the company with the wireless LAN connection state and operates as the external mode if it is not. Other configuration and operation are the same as that of the above-mentioned first exemplary embodiment of the present invention, basically.

That is to say, in the first and second exemplary embodiment of the present invention, while the usage state management unit 16 discriminates the in-house mode or the external mode, in this exemplary embodiment, the connection state management unit 32 discriminates the in-house mode or the external mode instead.

Thus, according to this exemplary embodiment, the explicit action of user such as executing login or logout operation is not required. For this reason, the information processing system according to the third exemplary embodiment of the present invention settles a problem that a problem on the security happens when the user forgets logout operation with an in-house mode, takes outside the company and uses it contrary to a policy. And the information processing system according to the third exemplary embodiment of the present invention also settles a problem which is such as an obstacle of convenience without login in the company and can raise safety and effectiveness of the convenience.

Figure 9:
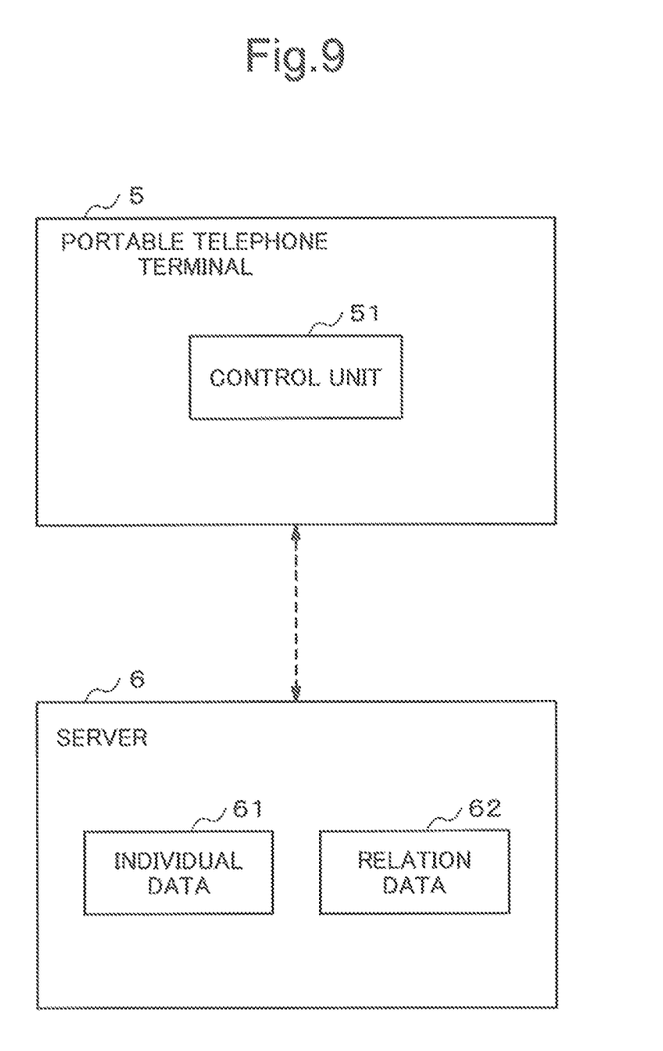
FIG. 9 is a block diagram showing a configuration example of an information processing system according to the fourth exemplary embodiment of the present invention.

FIG. 9 is a block diagram showing an exemplary configuration of an information processing system according to the fourth exemplary embodiment of the present invention. In FIG. 9, the information processing system according to the fourth exemplary embodiment of the present invention includes a portable telephone terminal 5 and a server 6. The server 6 is connected with the portable telephone terminal 5 via a public radio network. Further, any kind of connection means which can support data communication may be applied.

The server 6 holds individual data 61 accessible from the portable telephone terminal 5.

The server 6 also holds relation data 62 representing a relation between the state of the portable telephone terminal 5 and operation permitted for the state, for each individual data 61. Further, the permitted operation means, for example, access from the portable telephone terminal 5 to the individual data 61, permanent storage to the portable telephone terminal 5, temporary storage to the portable telephone terminal 5 or the like. The relation data 62 may be stored in a storage means provided in the server 6 in the form of, for example, the management table, the file and the database. The individual data 61 may also be stored in the storage means provided in the server 6. The server 6 may also equips with a means to store the individual data 61 and the relation data 62 externally.

The portable telephone terminal 5 manages and holds the state of the portable telephone terminal 5. The portable telephone terminal 5 equips a controller 51 which controls operation of the portable telephone terminal 5. Management and holding of the state of the portable telephone terminal 5 may be performed by the controller 51. The states of the portable telephone terminal 5 means the state that the portable telephone terminal 5 is inside of a company (in-house mode) and the state that it is outside of the company (external mode). The controller 51 controls the portable telephone terminal 5 for not executing any operation to data received from the server 6 beside the operation which is permitted corresponding to the state of the portable telephone terminal 5.

For example, when the portable telephone terminal 5 performs data access like file reading to the server 6, the following processing is performed. First, the portable telephone terminal 5 requests a transmission of the individual data 61 to a server 6. At this time, the portable telephone terminal 5 may transmit the state of the portable telephone terminal 5 to the server 6. The server 6 refers to the relation data 62 based on the requested individual data 61 and the state of portable telephone terminal 5, and gets the permitted operation. If the transmission of the individual data 61 is permitted, the server 6 transmits the requested individual data 61 to the portable telephone terminal 5. At that time, data which indicates the permitted operation may be transmitted together with the individual data 61.

Upon the reception of the individual data by the portable telephone terminal 5, the controller 51 controls a portable telephone terminal 5 so as not to execute operation besides the permitted operation among the operations listed in relation data 62. Assuming, for example, access from the portable telephone terminal 5 to the individual data 61, permanent storage in the portable telephone terminal 5 and temporary storage in the portable telephone terminal 5 are listed in the relation data 62. In this case, the controller 61 prohibits storage to a portable telephone terminal 5 of the individual data 61 if access from the portable telephone terminal 5 to the requested individual data 61 is permitted but neither permanent storage nor temporal storage to the portable telephone terminal 5 is permitted.

As is explained, according to this exemplary embodiment, an administrator of an information system of the company, for example, can set whether access and storage inside of the company or outside of the company are executable or not separately, for each data. By this thing, an information processing system according to the fourth exemplary embodiment of the present invention can prevent leakage of business data and false access to an in-house system in an information device for personal use such as a portable telephone.

While the present invention has been described in the above with reference to the exemplary embodiments, the present invention is not limited to the above-mentioned embodiments. Various changes which a person skilled in the art can understand in the scope of the present invention can be made in the configuration and detail of the present invention.

For example, while the management table is arranged on the server 2 in the first to fourth exemplary embodiments of the present invention, the copy of the management table may be arranged in the portable telephone terminal 1 for the preparation of disconnection between the portable telephone terminal 1 and the server 2. And the copy of this management table may be synchronized with the management table on the server 2 appropriately. In this case, it is possible not to store the substance of data in the portable telephone terminal 1. And, encrypting the data in advance, it is also possible to decrypt the data only when the management policy permits. In login operation of the first and second exemplary embodiment of the present invention, the login is possible when the portable telephone terminal 1 is outside of the company in fact. In order to prevent the above-mentioned, it may be confirmed whether the portable telephone terminal 1 is in the company or outside the company. As the confirmation method for this, for example, the following methods are included.

(1) If the portable telephone terminal 1 has the non-contact IC (Integrated Circuit) card function built-in, the entrance and exit of the portable telephone terminal 1 will be confirmed by touching the portable telephone terminal 1 with an IC card read-and-write part of a flapper gate of the company at a doorway. The portable telephone terminal 1 will become possible to log in when entering the company and logout state if it goes out.

(2) If the GPS (Global Positioning System) function is equipped on the portable telephone terminal 1, it will become possible to log in when it is confirmed that the portable telephone terminal 1 is in the location where the company is at the time of login.

(3) The portable telephone terminal 1 can login if it can communicate with a personal computer or the like at such as a seat in the company via a cable or Bluetooth (registered trademark) or the like.

INDUSTRIAL APPLICABILITY

The present invention is applicable for a portable telephone or a portable information communication apparatus in general with data browsing and storage function, operation execution function of such as program and a communication function.

This application is based upon and claims the benefit of priority from Japanese Patent Application No. 2008-165197, filed on Jun. 25, 2008, the disclosure of which is incorporated herein in its entirety by reference.

What is claimed is:

1. An information processing system, comprising:
a portable information device including a processor and a storage unit; and
a server device which includes:
a server data storage unit storing individual data and relation data, the individual data which is transmitted to the portable information device and accessible from the portable information device, and the relation data indicating a relationship between a state of the portable information device and permitted operation for the individual data at a time of an access request,
wherein the portable information device is configured to distinguish the state of the portable information device, the state being determined based on whether the portable information is in an area designated by an administrator of the portable information device,
wherein the portable information device is further configured to transmit the state of the portable information device to the server,
wherein the server device is configured to transmit the individual data and the relation data to the portable information device if permitted based on the state of the portable information device transmitted from the portable information device and the relation data, and
wherein the processor, by executing instructions stored in the storage unit, is configured to control not to execute any operation besides the operation described in the relation data with the permission and to determine whether the operation is permitted based on the relation data when the state of the portable information device transitions.

2. The information processing system according to claim 1, wherein the permitted operation includes:
an access from the portable information device;
storage to the portable information device; and
storage to the portable information device only in a designated time period.

3. The information processing system according to claim 1, wherein the portable information device is further configured to delete the individual data stored in the portable information device when the state transfers from a state in that storage of the individual data to the portable information device is permitted to a state in that the storage is not permitted.

4. The information processing system according to claim 1, wherein the individual data stored in the portable information device is deleted when a time period designated in advance has passed after being stored by the portable information device.

5. An information processing system, comprising:
a portable information device which includes a processor and a storage unit; and
a server device which includes a server data storage unit storing a function data and relation data, the function data which is transmitted to the portable information device and corresponds to a function that is executable in the portable information device, and the relation data indicating a relationship between a state of the portable information device and a function permitted to be executed at a time of an execution request,
wherein the portable information device is configured to distinguish the state of the portable information device by itself, the state being determined based on whether the portable information is in an area designated by an administrator of the portable information device,
wherein the portable information device is further configured to transmit the state of the portable information device to the server,
wherein the server device is configured to transmit the function data and the relation data to the portable information device if permitted based on the state of the portable information device transmitted from the portable information device and the relation data; and
wherein the processor is configured to, by executing instructions stored in the storage unit, control to execute the function with the permission and determine whether the function is permitted based on the relation data when the state of the portable information device transitions.

6. The information processing system according to claims 5, wherein the
function includes an individual execution program code that executes in the portable information device.

7. The information processing system according to claim 6, wherein a relation in a time period, when storage is permitted in the portable information device, is held for each execution program code; and the individual execution program code stored in the portable information device terminal is deleted after a time period designated by storage to the portable information device terminal has passed.

8. The information processing system according to claim 1, wherein the state of the portable information device is determined based on whether the portable information device moves in and out at a gateway of the area designated by the administrator of the portable information device.

9. The information processing system according to claim 1, wherein the state of the portable information device is determined by the position, indicated by a GPS (Global Positioning System), of the portable information device.

10. The information processing system according to claim 1, wherein the state of the portable information device is determined based on whether the portable information device is in a connected state with a computer designated by the administrator of the portable information device.

11. The information processing system according to claim 1, wherein the state of the portable information device is determined based on whether the portable information device is in a connected state with more than one wireless communication device.

12. The information processing system according to claim 11, wherein the connected state with the wireless communication device indicates whether connecting with a wireless LAN (Local Area Network).

13. The information processing system according to claim 1, wherein the portable information device is a portable telephone terminal.

14. A portable information device, comprising:
a processor and a storage unit,
wherein the portable information device is configured to be connected to a server device which includes a server data storage unit storing individual data and relation data, the individual data which is transmitted to the portable information device and accessible from the portable information device, the relation data indicating a relationship between a state of the portable information device and an operation permitted for the individual data at a time of an access request,
wherein the portable information device is further configured to distinguish the state of the portable information device, the state being determined based on whether the portable information is in an area designated by an administrator of the portable information device,
wherein the portable information device is further configured to transmit the state of the portable information device to the server,
wherein the server is configured to transmit the individual data and the relation data to the portable information device if permitted based on the state of the portable information device transmitted from the portable information device and the relation data, and
wherein the processor is configured to, by executing instructions stored in the storage unit, control not to execute any operation besides the operation described in the relation data with the permission and determine whether the operation is permitted based on the relation data when the state of the portable information device transitions.

* * * * *